(12) United States Patent
Shin

(10) Patent No.: US 7,869,109 B2
(45) Date of Patent: Jan. 11, 2011

(54) PORTABLE PROJECTOR

(75) Inventor: Sung Chul Shin, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1214 days.

(21) Appl. No.: 11/482,154

(22) Filed: Jul. 7, 2006

(65) Prior Publication Data

US 2007/0046907 A1 Mar. 1, 2007

(30) Foreign Application Priority Data

Aug. 31, 2005 (KR) ............. 10-2005-0080896
Sep. 15, 2005 (KR) ............. 10-2005-0086431
Sep. 29, 2005 (KR) ............. 10-2005-0091338

(51) Int. Cl.
*G02B 26/08* (2006.01)
(52) U.S. Cl. ................................. 359/204.5
(58) Field of Classification Search .......... 359/224.1, 359/198.1–226.1
See application file for complete search history.

(56) References Cited

U.S. PATENT DOCUMENTS

| | | | |
|---|---|---|---|
| 4,704,000 A | 11/1987 | Pekar et al. | |
| 4,711,512 A | 12/1987 | Upatnieks | |
| 5,224,198 A | 6/1993 | Jachimowicz et al. | |
| 5,369,415 A | 11/1994 | Richard et al. | |
| 5,465,311 A | 11/1995 | Caulfield et al. | |
| 5,821,911 A | 10/1998 | Jachimowicz | |
| 6,580,528 B1 | 6/2003 | Imoto et al. | |
| 6,821,457 B1 | 11/2004 | Natarajan et al. | |
| 6,870,682 B1 * | 3/2005 | Grenier et al. | 359/627 |
| 2003/0048422 A1 | 3/2003 | Lowenthal et al. | |
| 2004/0004767 A1 | 1/2004 | Song | |
| 2004/0056977 A1 | 3/2004 | Kim | |
| 2005/0007562 A1 | 1/2005 | Seki et al. | |
| 2005/0013606 A1 | 1/2005 | Yang et al. | |
| 2005/0117837 A1 | 6/2005 | Cerato | |
| 2006/0017887 A1 | 1/2006 | Jacobson et al. | |
| 2006/0087423 A1 | 4/2006 | Coronel et al. | |
| 2006/0187419 A1 | 8/2006 | Yavid | |

FOREIGN PATENT DOCUMENTS

| | | |
|---|---|---|
| CN | 1510453 A | 7/2004 |
| EP | 0 535 402 A1 | 4/1993 |
| EP | 1 215 522 A2 | 6/2002 |

(Continued)

*Primary Examiner*—Euncha P Cherry
(74) *Attorney, Agent, or Firm*—Birch, Stewart, Kolasch & Birch, LLP

(57) ABSTRACT

A portable projector is disclosed. The portable projector comprises a light transmission member having first and second surfaces, a multi-type laser light source including a plurality of sub laser light sources for emitting light beams onto the first surface of the member based on an external image signal, so as to allow the light beams to be transmitted into the member, one or more optical elements supported on at least one of the first and second surfaces of the member for diffracting and reflecting the light beams incident from the multi-type laser light source into the member, and at least one multi-type scan mirror supported on one of the first and second surfaces of the member for scanning the light beams diffracted and reflected from the optical elements onto an external screen located at the outside of the member, based on an external control signal.

36 Claims, 10 Drawing Sheets

FOREIGN PATENT DOCUMENTS

| | | |
|---|---|---|
| EP | 1 722 254 A2 | 11/2006 |
| JP | 3-84538 A | 4/1991 |
| KR | 2000-0003888 A | 1/2000 |
| KR | 2000-0044177 A | 7/2000 |
| KR | 2000-0044178 A | 7/2000 |
| KR | 1999-0055242 A | 7/2001 |
| KR | 2004-0055544 A | 6/2004 |
| KR | 2005-0014301 A | 2/2005 |
| WO | WO-2005/054929 A2 | 6/2005 |

* cited by examiner

PORTABLE PROJECTOR

This application claims the benefit of the Korean Patent Application No. P2005-80896 filed on Aug. 31, 2005, No. P2005-86431 filed on Sep. 15, 2005 and p2005-91338 filed on Sep. 29, 2005, which is hereby incorporated by reference as if fully set forth herein.

BACKGROUND OF THE INVENTION

1. Field of the Invention

The present invention relates to a projector, and more particularly, to a portable projector.

2. Discussion of the Related Art

The recent tendency of display devices is to provide a large screen size as well as lightness and thinness. Of such display devices, projectors have been greatly highlighted because they can realize a large screen of 100 inches or more.

Such a projector is a display device which projects an image generated from a micro device such as a liquid crystal display (LCD) panel, a reflective liquid crystal on silicon (LCoS) panel, or a digital micro-mirror device (DMD) panel, onto a screen, thereby displaying the image.

Generally, such a projector is classified into a single panel type, a double panel type, or a triple panel type in accordance with the number of micro devices used in the projector.

In a single panel type projector, white light is separated into color light components in a time-division manner, and the separated color light components are illuminated to a single micro device. In a double panel type projector, white light is separated into color light components in a space-division and time-division manner, and the color light components are illuminated to two micro devices. In a triple panel type projector, white light is separated into color light components in a space-division manner, and the color light components are illuminated to three micro devices.

FIG. 1 is a schematic view illustrating an arrangement of a general single panel type projector. FIG. 2 is a perspective view illustrating an arrangement of a general triple panel type projector.

As shown in FIG. 1, the single panel type projector includes a light source 2, a color drum 3, a rod lens 4, illumination lenses 5 and 6, a micro device 7, a prism 8, and a projection lens unit 1.

In the illustrated single panel type projector, light emitted from the light source 2 is separated into red, green, and blue light beams while passing through the color drum 3. The separated light beams are modulated to have uniform brightness while passing through the rod lens 4. The light beams are then incident on the micro device 7 after passing through the illumination lenses 5 and 6 and the prism 8.

The incident light beams have an image signal while passing through the micro device 7, and are projected on a screen after passing through the prism 8 and projection lens unit 1.

Also, as shown in FIG. 2, the triple panel type projector includes dichroic mirrors 9 separating light emitted from the light source 2 into red, green, and blue light beams. The separated red, green, and blue light beams are incident on corresponding LCD panels 10, respectively. The incident light beams are then composed to thereby be projected onto a screen via the projection lens unit 1.

The conventional projectors having the above-mentioned arrangement, however, have a problem in that they require not only a great number of optical elements, but also an excessively large installation space due to a three dimensional arrangement of an optical system.

Such an arrangement of the optical system makes it impossible to reduce the entire size of the projector.

Also, the conventional projectors generally suffer from the loss of light because a traveling path of the light from the light source to the projection lens unit is long. Therefore, the conventional projectors have a limitation to display a bright and vivid image.

Due to the three dimensional arrangement of the optical system, furthermore, the conventional projectors have a problem in that an arrangement of optical elements is unstable.

SUMMARY OF THE INVENTION

Accordingly, the present invention is directed to a portable projector that substantially obviates one or more problems due to limitations and disadvantages of the related art.

An object of the present invention is to provide a portable projector, which includes a novel arrangement of an optical system capable of minimizing the space of the optical system, thereby achieving a reduction in the size of the projector.

Another object of the present invention is to provide a portable projector, which can minimize the path of light, thereby achieving a reduction in the loss of light.

Yet another object of the present invention is to provide a portable projector, which can achieve a stabilized arrangement of optical elements.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a portable projector comprises: a light transmission member having first and second surfaces; a multi-type laser light source for emitting light beams onto the first surface of the member based on an external image signal, so as to allow the light beams to be transmitted into the member, the multi-type laser light source including a plurality of sub laser light sources; one or more optical elements supported on at least one of the first and second surfaces of the member for diffracting and reflecting the light beams incident from the multi-type laser light source into the member; and at least one multi-type scan mirror supported on one of the first and second surfaces of the member for scanning the light beams diffracted and reflected from the optical elements onto an external screen located at the outside of the member based on an external control signal.

Here, the light transmission member may be a glass member, transparent plastic member, or hollow member having an atmosphere or vacuum pressure interior. The light transmission member may have a circular, semi-circular, triangular, or polygonal cross section.

The light transmission member may have linear and flat surfaces. Of all surfaces of the light transmission member, the at least one surface on which the optical elements are supported is raised or dented.

The multi-type laser light source may include at least one first sub laser light source emitting red laser light beams, at least one second sub laser light source emitting green laser light beams, and at least one third sub laser light source emitting blue laser light beams, the first, second, and third sub laser light sources being arranged in parallel. The multi-type scan mirror includes a first one-dimensional scan mirror scanning incident light beams horizontally and a second one-dimensional scan mirror scanning incident light beams vertically, or includes a two-dimensional scan mirror scanning incident light beams vertically and horizontally.

In accordance with a further aspect of the present invention, there is provided a portable projector comprising: a light transmission member having first and second surfaces; a multi-type laser light source for emitting laser light beams onto the first surface of the member based on an external image signal, so as to allow the light beams to be transmitted into the member, the multi-type laser light source including a plurality of sub laser light sources; a first lens group supported on the first surface of the member for diffracting the light beams incident from the multi-type laser light source, to emit the light beams to the second surface of the member, the first lens group including a plurality of sub lenses; a second lens group supported on the second surface of the member for diffracting the light beams diffracted from the first lens group, the second lens group including a plurality of sub lenses; a first multi-type scan mirror supported on the first surface of the member for scanning the light beams diffracted from the second lens group based on an external control signal; and a second multi-type scan mirror supported on the second surface of the member for scanning the light beams scanned from the first multi-type scan mirror based on an external control signal.

Preferably, the number of the sub lenses of the first lens group may be equal to that of the sub laser light sources of the multi-type laser light source, and the sub lenses of the first lens group may be arranged in parallel to correspond to the respective sub laser light sources.

Each sub lens of the first lens group is a diffraction optical element having a first surface on which the laser light beams are incident and a second surface from which the laser light beams are emitted, the first surface having a grating angle for converging the laser light beams, and the second surface having a grating angle for changing the path of the laser light beams.

The sub lenses of the second lens group may be diffraction optical elements, in the form of bars, including a first sub lens diffracting red laser light beams, a second sub lens diffracting green laser light beams, and a third sub lens diffracting blue laser light beams.

The first multi-type scan mirror may include a first sub scan mirror scanning red laser light beams, a second sub scan mirror scanning green laser light beams, and a third sub scan mirror scanning blue laser light beams, the first, second, and third sub scan mirrors being arranged in parallel. The second multi-type scan mirror may include one or more sub scan mirrors, and the number of the sub scan mirrors is equal to that of the sub laser light sources of the multi-type laser light source.

In accordance with another aspect of the present invention, there is provided a portable projector comprising: a light transmission member having first and second surfaces; a multi-type laser light source for emitting laser light beams onto the first surface of the member based on an external image signal, so as to allow the light beams to be transmitted into the member, the multi-type laser light source including a plurality of sub laser light sources; a first lens group supported on the first surface of the member for diffracting the light beams incident from the multi-type laser light source, to emit the diffracted light beams to the second surface of the member, the first lens group including a plurality of sub lenses; a second lens group supported on the second surface of the member for diffracting the light beams diffracted from the first lens group, the second lens group including a plurality of sub lenses; a mirror supported on the first surface of the member for reflecting the light beams diffracted from the second lens group; and a multi-type scan mirror supported on the second surface of the member for scanning the light beams reflected from the mirror based on an external control signal.

In accordance with yet another aspect of the present invention, there is provided a portable projector comprising: a light transmission member having first and second surfaces; a multi-type laser light source for emitting light beams onto the first surface of the member based on an external image signal, so as to allow the light beams to be transmitted into the member, the multi-type laser light source including one or more first, second, and third sub laser light sources; a first lens group supported on the first surface of the member for diffracting the light beams incident from the first sub laser light sources, to emit the diffracted light beams to the second surface of the member, the first lens group including a plurality of sub lenses; a first mirror group supported on the second surface of the member for reflecting the light beams diffracted from the first lens group, the first mirror group including a plurality of sub mirrors; a second lens group supported on the first surface of the member for diffracting not only the light beams incident from the second sub laser light sources, but also the light beams reflected from the first mirror group, to the second surface of the member, the second lens group including a plurality of sub lenses; a second mirror group supported on the second surface of the member for reflecting the light beams diffracted from the second lens group, the second mirror group including a plurality of sub mirrors; a third lens group supported on the first surface of the member for diffracting not only the light beams incident from the third sub laser light sources, but also the light beams reflected from the second mirror group, to emit the diffracted light beams to the second surface of the member, the third lens group including a plurality of sub lenses; a plurality of diffraction lenses supported on at least one of the first and second surfaces of the member for diffracting the light beams diffracted from the third lens group; and a scan mirror supported on the first surface of the member for scanning the light beams diffracted from the diffraction lenses based on an external control signal.

The first sub laser light sources may emit red laser light beams, the second sub laser light sources may emit green laser light beams, and the third sub laser light sources may emit blue laser light beams, the first, second, and third sub laser light sources being arranged in parallel to be uniformly spaced apart from one another. The number of the sub lenses of the first, second, or third lens group may be equal to that of the first, second, or third sub laser light sources, and the sub lenses of the first, second, or third lens group may be arranged in parallel to correspond to the associated first, second, or third sub laser light sources.

Each sub lens of the first, second, and third lens group may be a diffraction optical element having a first surface on which the laser light beams are incident and a second surface from which the laser light beams are emitted, the first surface having a grating angle for converging the laser light beams, and the second surface having a grating angle for changing the path of the laser light beams.

Each sub lens of the second lens group may be provided, at a surface thereof on which the light beams reflected from the first mirror group are incident, with a beam splitter transmitting a green wavelength while performing total reflection of a red wavelength.

The projector may further comprise: a plurality of plates placed on one surface of the respective sub lens of the first, second, and third lens groups, the surface facing the multi-type laser light source, each plate having an irregular surface pattern for removing speckle noise of the light beams emitted from the multi-type laser light source; and a drive for simultaneously reciprocating the first, second, and third lens groups along with the plates in one direction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
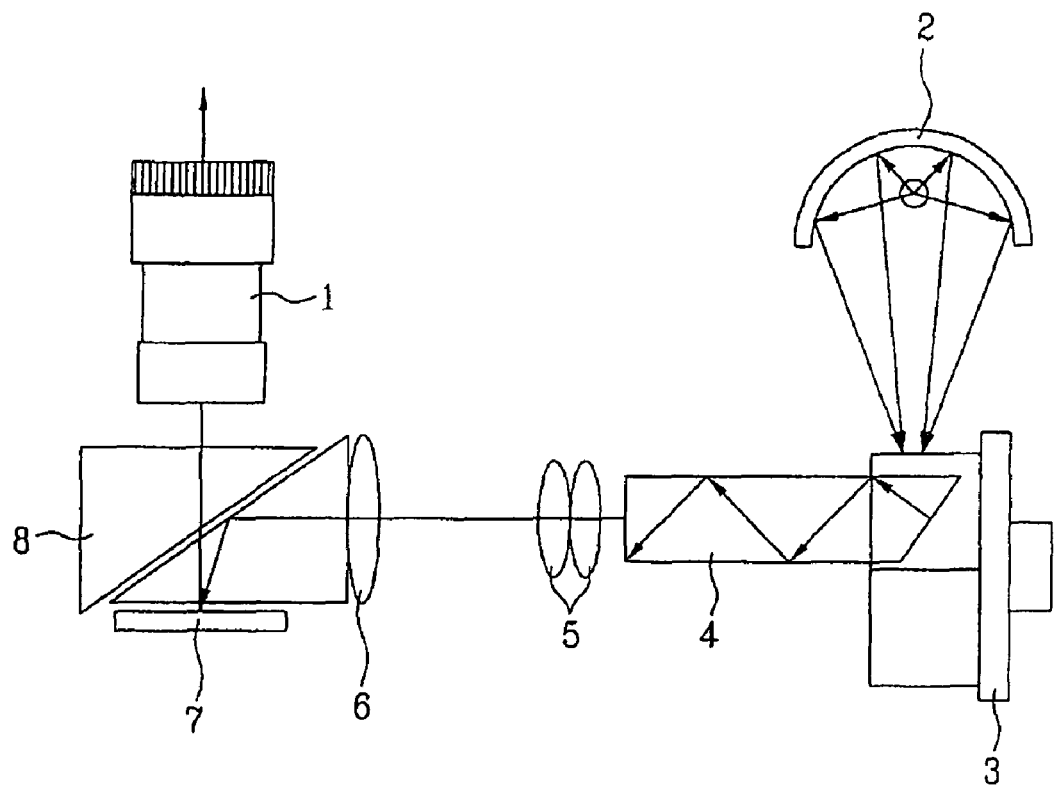
FIG. 1 is a view illustrating an arrangement of a general single panel type projector.
Figure 2:
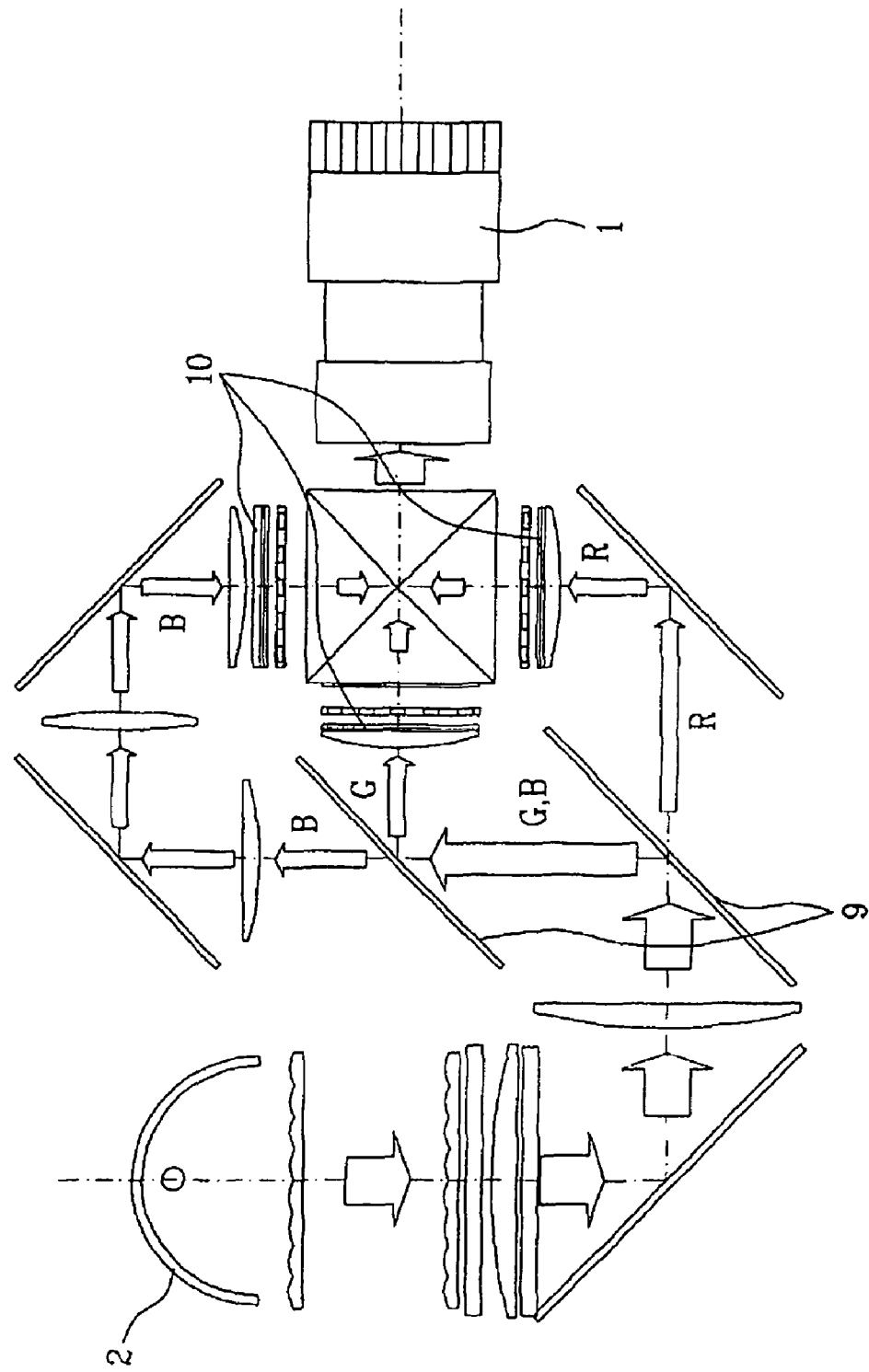
FIG. 2 is a view illustrating an arrangement of a general triple panel type projector.

Reference will now be made in detail to the preferred embodiments of the present invention, examples of which are illustrated in the accompanying drawings. Wherever possible, the same reference numbers will be used throughout the drawings to refer to the same or like parts.

The concept of the present invention is to provide a portable projector wherein a plurality of optical elements are arranged at two facing surfaces of a light transmission member for achieving a stabilized arrangement of the optical elements, and light beams are transmitted through the light transmission member for reducing the length of the path of light.

The design of the portable projector according to the present invention is characterized in that a multi-type laser light source includes a plurality of sub laser light sources arranged in parallel, and the optical elements are positioned on the light transmission member to have an arrangement suitable for the use of the multi-type laser light source.

An optical system of the present invention basically includes a light transmission member, a multi-type laser light source including a plurality of sub laser light sources, a multi-type scan mirror including a plurality of sub scan mirrors and a plurality of optical elements.

Here, the light transmission member may be a glass member, transparent plastic member, or hollow member having an atmosphere or vacuum pressure interior. Of course, it should be understood that other materials may be used to form the light transmission member so long as they have high light transmission efficiency, and the size of the light transmission member may be determined based on the design of the optical system.

When occasion demands, the light transmission member may be fabricated to have a circular, semi-circular, triangular, or polygonal cross section.

In the embodiments of the present invention, the light transmission member is fabricated to have linear and flat surfaces.

In accordance with the design of the optical system, furthermore, of all the surfaces of the light transmission member, certain surface(s) on which the optical elements are supported, may be fabricated to be raised or dented.

The multi-type laser light source is designed to emit light beams onto a first surface of the light transmission member based an external image signal, so as to allow the light beams to be transmitted into the member.

Here, the multi-type laser light source includes at least one first sub laser light source emitting red laser beams, at least one second sub laser light source emitting green laser beams, and at least one third sub laser light source emitting blue laser beams. The first, second, and third sub laser light sources are arranged in parallel.

The first, second, and third sub laser light sources may be arranged in the form of a bundle, or may be uniformly spaced apart from one another.

The multi-type laser light source may be supported on the first surface of the light transmission member, or may be supported on another member while being spaced apart from the first surface by a predetermined distance.

The light transmission member further has a second surface facing the first surface, and the optical elements may be supported on at least one of the first and second surfaces of the light transmission member and used to diffract and reflect the light beams incident from the multi-type laser light source into the member.

Preferably, the optical elements may include a diffraction optical element, hologram optical element, plane mirror, and micro display, etc, and may be fabricated in the form of a flat plate, respectively.

The optical elements of the present invention can be fabricated into various forms in accordance with the design of the optical system.

In the optical system of the present invention, the optical elements, which are supported on the first surface and/or second surface of the light transmission member, are arranged along the same line parallel to each other.

The optical elements, which are supported on the first surface of the light transmission member, may be positioned alternately with the optical elements which are supported on the second surface of the light transmission member, at a predetermined angle.

The reason of such an alternate arrangement is to minimize the transmission path of light.

To optimize the configuration of the optical system according to the present invention, preferably, the optical elements having drive circuits are arranged on the first surface of the light transmission member, and the optical elements having no drive circuit are arranged on the second surface of the light transmission member.

The reason why the optical elements requiring the arrangement of circuits are gathered on one side is to maximize the utilization of space, thereby achieving a remarkable reduction in the size of the optical system.

The multi-type scan mirror is supported on at least one of the first and second surfaces of the light transmission member. The multi-type scan mirror is used to scan the light beams diffracted and reflected from the optical elements, onto an external screen based on an external control signal.

The multi-type scan mirror may include a first one-dimensional scan mirror scanning incident light beams horizontally and a second one-dimensional scan mirror scanning incident light beams vertically, or may include a two-dimensional scan mirror scanning incident light beams vertically and horizontally.

Figure 3:
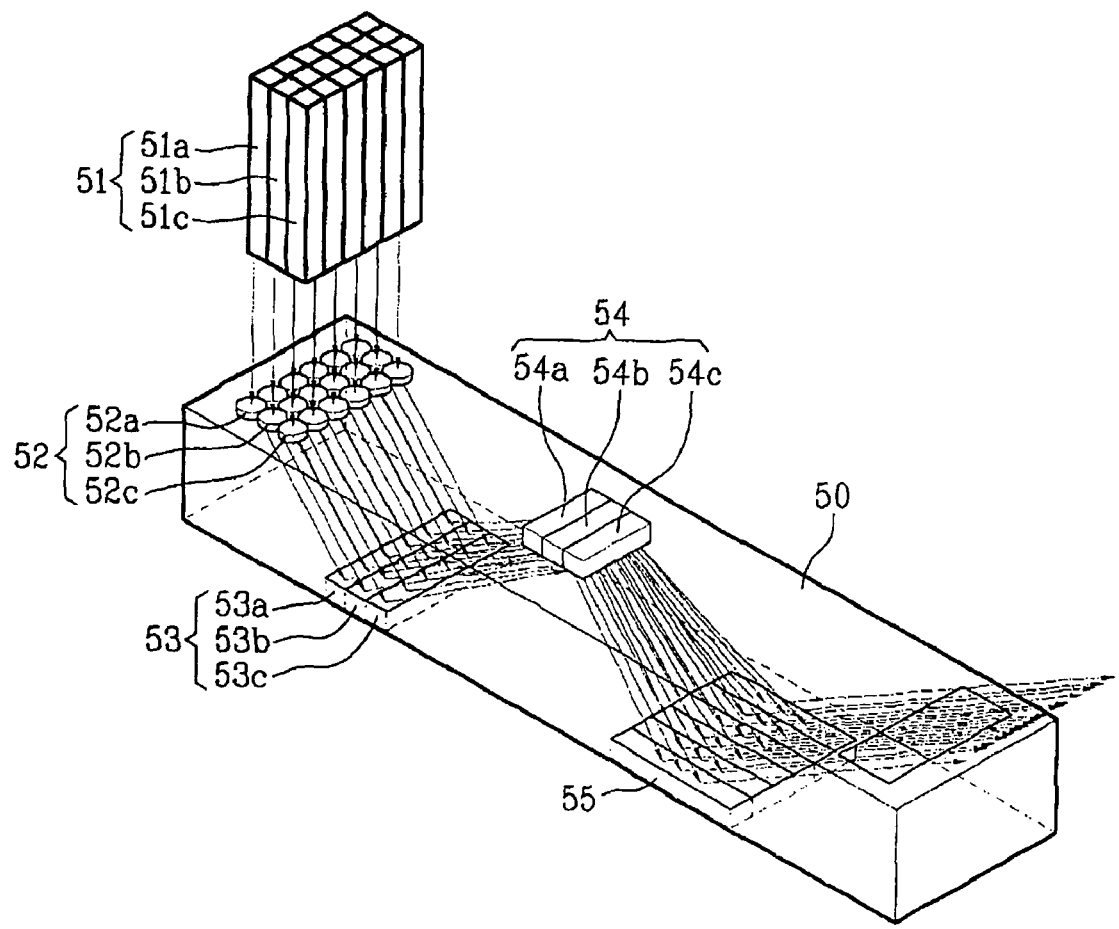
FIG. 3 is a perspective views illustrating a portable projector in accordance with a first embodiment of the present invention.

FIG. 3 is a perspective view illustrating a portable projector in accordance with a first embodiment of the present invention.

As shown in FIG. 3, the portable projector of the present invention includes a light transmission member 50, a multi-type laser light source 51, first and second lens groups 52 and 53, and first and second multi-type scan mirrors 54 and 55.

The light transmission member 50 may be a glass member, transparent plastic member, or hollow member having an atmosphere or vacuum pressure interior. Of course, it should be understood that other materials may be used to form the light transmission member 50 so long as they have high light transmission efficiency, and the size of the light transmission member 50 may be determined based on the design of the optical system.

The light transmission member 50 may have a circular, semi-circular, triangular, or polygonal cross section as occasion demands.

In the embodiment of the present invention, the light transmission member 50 is fabricated to have linear and flat surfaces.

In accordance with the design of the projector, of all the surfaces of the light transmission member 50, certain surface regions where the first and second lens groups 52 and 53 and first and second multi-type scan mirrors 54 and 55 are supported may be fabricated to be raised or dented.

The multi-type laser light source 51 is designed to emit light beams onto a first surface of the light transmission member 50 based on an external image signal, so as to allow the light beams to be transmitted into the member 50. The multi-type laser light source 51 includes a plurality of sub laser light sources.

Specifically, the multi-type laser light source 51 includes first, second, and third sub laser light sources 51a, 51b, and 51c, which are arranged in parallel. The multi-type laser light source 51 may be supported on the first surface of the light transmission member 50, or may be supported on another member while being spaced apart from the first surface.

Each of the first, second, and third sub laser light sources 51a, 51b, and 51c is configured such that a plurality of first, second, or third sub laser light sources are arranged in parallel.

The first sub laser light sources 51a are adapted to emit red laser light beams, the second sub laser light sources 51b are adapted to emit green laser light beams, and the third sub laser light sources 51c are adapted to emit blue laser light beams.

The first lens group 52 is supported on the first surface of the member 50, and is used to diffract the light beams incident from the multi-type laser light source 51 onto the second surface of the member 50.

Here, the first lens group 52 may include diffraction optical element (DOE) type lenses. In accordance with the design of the optical system, a variety of DOE lenses are usable.

The first lens group 52 includes a plurality of first sub lenses 52a corresponding to the first sub laser light sources 51a of the multi-type laser light source 51, a plurality of second sub lenses 52b corresponding to the second sub laser light sources 51b of the multi-type laser light source 51, and a plurality of third sub lenses 52c corresponding to the third sub laser light sources 51c of the multi-type laser light source 51. The first, second, and third sub lenses 52a, 52b, and 52c are arranged in parallel.

Preferably, the number of the first, second, or third sub lenses 52a, 52b, or 52c of the first lens group 52 is equal to that of the associated first, second, or third sub laser light sources 51a, 51b, and 51c of the multi-type laser light source 51.

Each sub lens of the first lens group 52 has an upper surface on which the laser light beams are incident, and a lower surface from which the laser light beams are emitted, and the upper and lower surfaces of the lens have different grating states from each other.

Figure 4A:
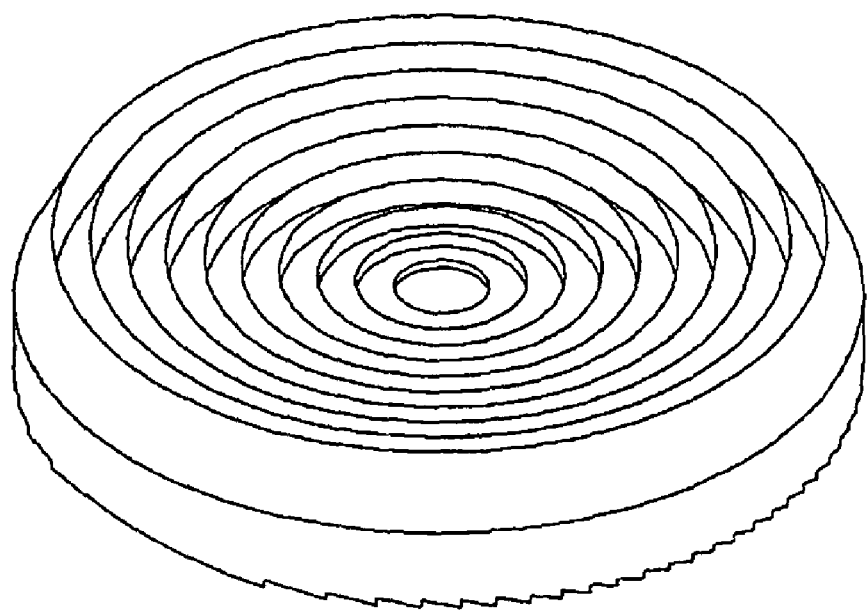
FIGS. 4A and 4B are a perspective view and a sectional view, respectively, illustrating a grating angle of a first lens group used in the first embodiment of the present invention.
Figure 4B:
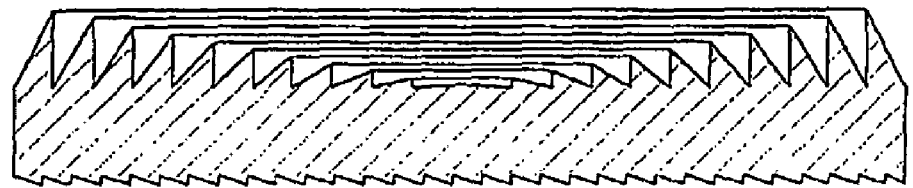

As shown in FIGS. 4A and 4B, the laser light beam incident surface of the lens has a grating angle for converging the laser light beams, whereas the laser light beam emitting surface of the lens has a grating angle for changing the path of the laser light beams.

The grating structure of such a sub lens may be changed in various manners in accordance with the design of the optical system.

The second lens group 53 is supported on the second surface of the member 50, and is used to diffract the light beams diffracted from the first lens group 53.

The second lens group 53 includes first, second, and third sub lenses 53a, 53b, and 53c arranged in parallel.

The first sub lens 53a of the second lens group 53 is adapted to diffract red laser light beams, the second sub lens 53b of the second lens group 53 is adapted to diffract green laser light beams, and the third sub lens 53c of the second lens group 53 is adapted to diffract blue laser light beams.

Each of the first, second, and third sub lenses 53a, 53b, and 53c of the second lens group 53 is formed of a single DOE type lens in the form of a bar.

The first multi-type scan mirror 54 is supported on the first surface of the member 50, and is used to scan the light beams diffracted from the second lens group 53 based on an external control signal.

The first multi-type scan mirror 54 may be a galvano mirror scanning incident light beams horizontally.

Here, the first multi-type scan mirror 54 includes a first sub scan mirror 54a scanning red laser light beams, a second sub scan mirror 54b scanning green laser light beams, and a third sub scan mirror 54c scanning blue laser light beams. The first, second, and third sub scan mirrors 54a, 54b, and 54c are arranged in parallel.

The second multi-type scan mirror 55 is supported on the second surface of the member 50, and is used to scan the light beams scanned from the first multi-type scan mirror 54 based on an external control signal.

Here, the second multi-type scan mirror 55 may be a galvano mirror scanning incident light beams vertically.

The second multi-type scan mirror 55 includes at least one sub scan mirror. The number of the sub scan mirror of the second multi-type scan mirror 55 may be equal to that of the sub laser light sources 51a, 51b, or 51c of the multi-type laser light source 51.

Preferably, the first and second surfaces of the light transmission member 50 are arranged to face each other, and the first and second lens groups 52 and 53 and first and second multi-type scan mirrors 54 and 55 are fabricated in the form of a flat plate, respectively.

The first lens group 52 and first multi-type scan mirror 54 are supported on the first surface of the light transmission member 50 while being arranged along the same line parallel to each other. Also, the second lens group 53 and second multi-type scan mirror 55 are supported on the second surface of the light transmission member 50 while being arranged along the same line parallel to each other.

The first lens group 52 and first multi-type scan mirror 54, which are supported on the first surface of the light transmission member 50, may be positioned alternately with the second lens group 53 and second multi-type scan mirror 55 which are supported on the second surface of the light transmission member 50, at a predetermined angle.

The reason of such an alternate arrangement is to minimize the transmission path of light.

To optimize the configuration of the optical system according to the present invention, preferably, the optical elements having drive circuits are arranged on the first surface of the light transmission member 50, and the optical elements having no drive circuit are arranged on the second surface of the light transmission member 50.

The reason why the optical elements requiring an arrangement of circuits are gathered on one side is to maximize the utilization of space, thereby achieving a remarkable reduction in the size of the optical system.

Now, the operation method of the portable projector in accordance with the present invention having the above described configuration will be explained.

As shown in FIG. 3, first, the multi-type laser light source 51, which includes the plurality of first, second, and third sub laser light sources 51a, 51b, and 51c, emits light beams onto the first surface of the light transmission member 50 based on an external image signal.

The light beams, emitted from the multi-type laser light source 51, are incident on the first, second, and third sub lenses 52a, 52b, and 52c of the first lens group 52 that is supported on the first surface of the light transmission member 50.

Subsequently, the first lens group 52 diffracts the incident light beams, to emit the diffracted light beams to the second lens group 53 that is placed on the second surface of the light transmission member 50.

Then, the second lens group 53 again diffracts the light beams diffracted from the first lens group 52, to emit the diffracted light beams to the first multi-type scan mirror 54 that is placed on the first surface of the light transmission member 50.

Specifically, the first sub lens 53a of the second lens group 53 diffracts the red laser light beams emitted from the first sub lenses 52a of the first lens group 52, the second sub lens 53b of the second lens group 53 diffracts the green laser light beams emitted from the second sub lenses 52b of the first lens group 52, and the third sub lens 53c of the second lens group 53 diffracts the blue laser light beams emitted from the third sub lenses 52c of the first lens group 52.

Thereafter, the first multi-type scan mirror 54 primarily scans the light beams diffracted from the second lens group 53 horizontally.

Figure 6:
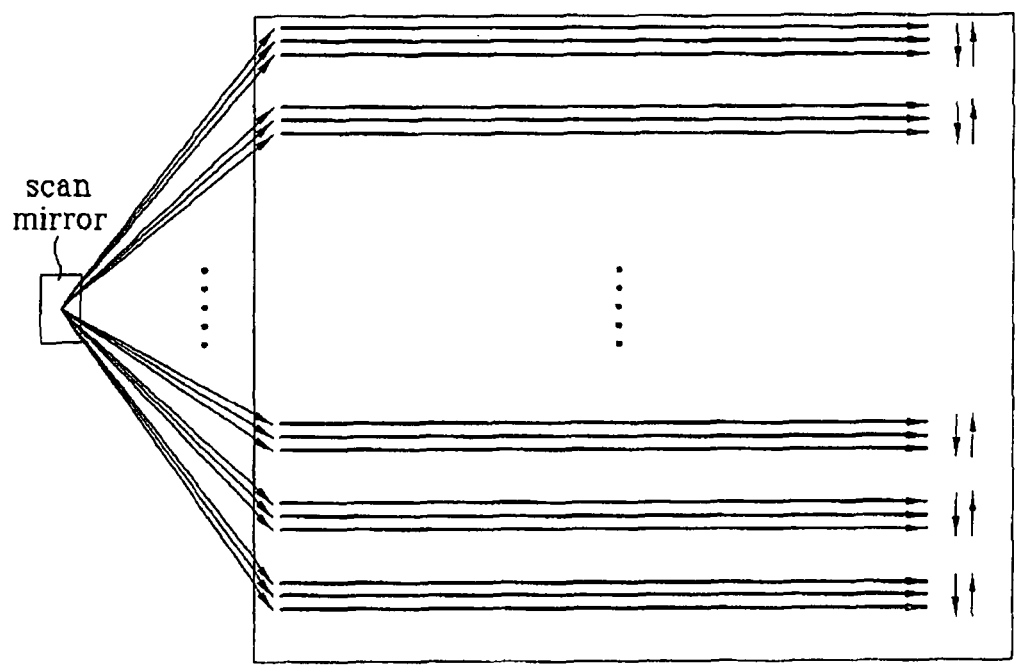
FIG. 6 is a view illustrating image scan lines obtained by a multi-type scan mirror used in the present invention.

Then, as shown in FIG. 6, the second multi-type scan mirror 55 secondarily scans the light beams vertically, which have been primarily scanned from the first multi-type scan mirror 54, to emit the light beams onto an external screen.

Figure 5:
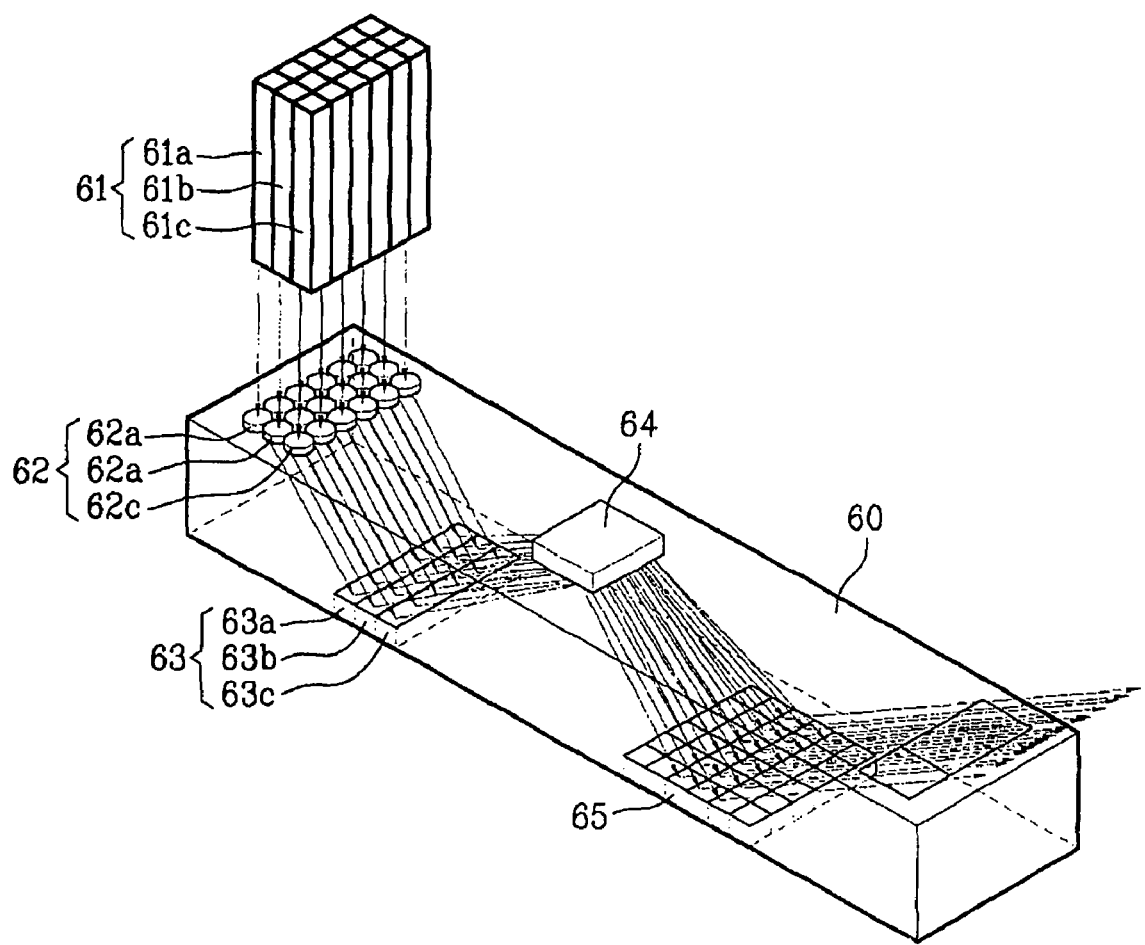
FIG. 5 is a perspective view illustrating a portable projector in accordance with a second embodiment of the present invention.

FIG. 5 is a perspective view illustrating a portable projector in accordance with a second embodiment of the present invention.

The second embodiment of the present invention differs from the above described first embodiment of the present invention in view of the fact that one of the multi-type scan mirrors of the first embodiment is substituted by a single scan mirror.

As shown in FIG. 5, the projector according to the second embodiment of the present invention includes a light transmission member 60, a multi-type laser light source 61, first and second lens groups 62 and 63, a mirror 64, and a multi-type scan mirror 65.

Here, the multi-type scan mirror 65 may use a galvano mirror scanning incident light beams in a two dimensional manner.

The other configurations and operation of the second embodiment are similar to those of the first embodiment, and no detailed description thereof will be given.

The portable projector in accordance with the present invention having the above described operation method is able to achieve not only a stabilized arrangement of the optical elements, but also a reduction in the length of the path of light because light beams are transmitted through the light transmission member. Accordingly, the portable projector of the present invention can achieve a reduction in size and weight.

Figure 7:
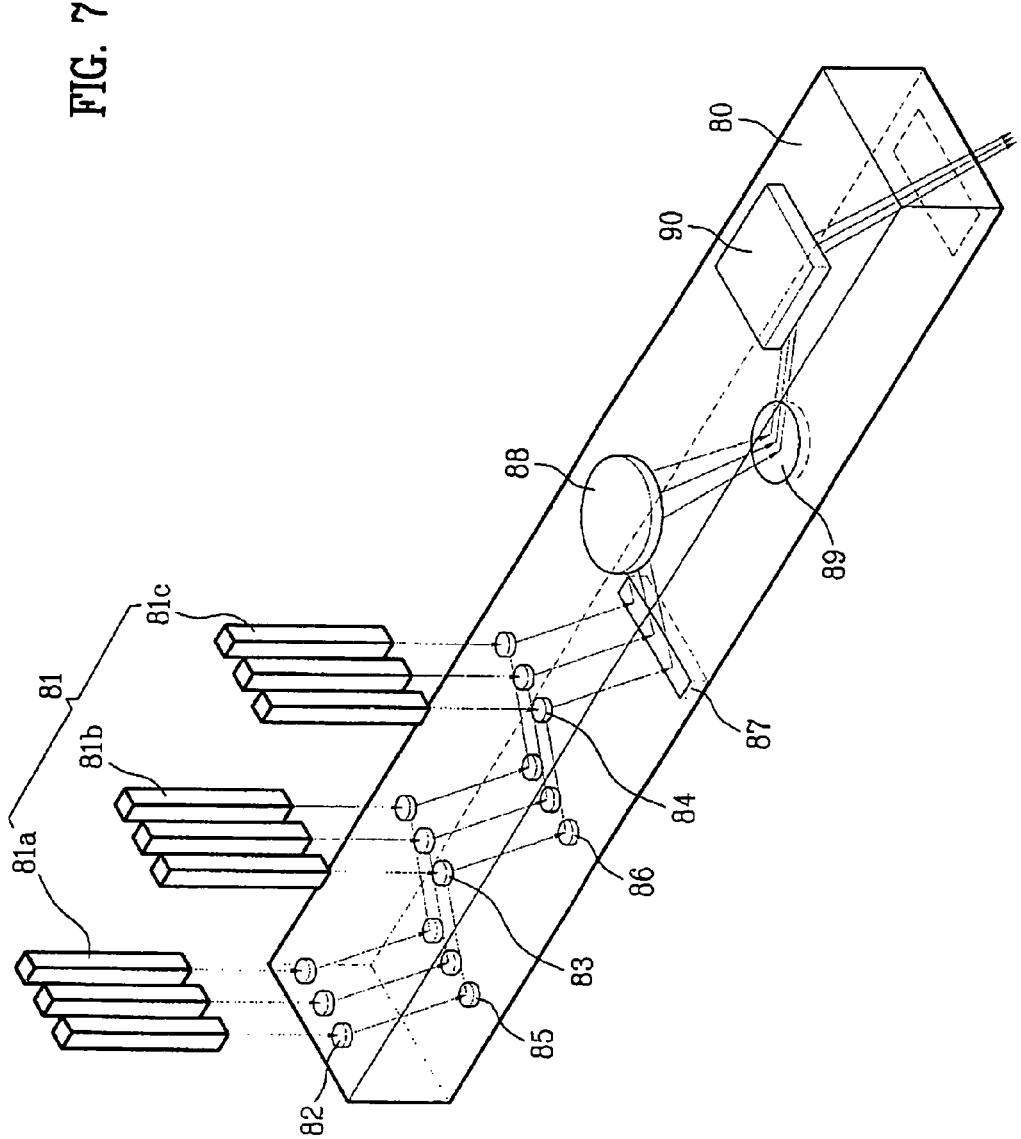
FIG. 7 is a perspective view illustrating a portable projector in accordance with a third embodiment of the present invention.

FIG. 7 is a perspective view illustrating a portable projector in accordance with a third embodiment of the present invention.

As shown in FIG. 7, the projector according to the third embodiment of the present invention includes a light transmission member 80, a multi-type laser light source 81, first, second, and third lens groups 82, 83, and 84, first and second mirror groups 85 and 86, first, second, and third diffraction lenses 87, 88, and 89, and a scan mirror 90.

Here, the light transmission member 80 is equal to that of the above described first embodiment of the present invention, and no detailed description thereof will be given.

In accordance with the design of the portable projector, of all the surfaces of the light transmission member 80, certain surface regions where the first, second, and third lens groups 82, 83, and 84, first and second mirror groups 85 and 86, first, second, and third diffraction lenses 87, 88, and 89, and scan mirror 90 are supported may be raised or dented.

The multi-type laser light source 81 is designed to emit light beams onto a first surface of the light transmission member 80 based on an external image signal, so as to allow the light beams to be transmitted into the member 80. The multi-type laser light source 81 includes a plurality of sub laser light sources.

Specifically, the multi-type laser light source 81 includes one or more red laser light sources 81a, one or more green laser light sources 81b, and one or more blue laser light sources 81c. The multi-type laser light source 81 may be supported on the first surface of the light transmission member 80, or may be supported on another member while being spaced apart from the first surface by a predetermined distance.

The first lens group 82 is supported on the first surface of the member 80, and is used to diffract the light beams incident from the red laser light sources 81a of the multi-type laser light source 81 onto a second surface of the member 80.

Here, the first lens group 82 may include diffraction optical element (DOE) type lenses. In accordance with the design of the optical system, a variety of DOE lenses are usable.

The first lens group 82 includes a plurality of sub lenses. The sub lenses are arranged in parallel such that each sub lens corresponds to an associated one of the red laser light sources 81a.

Preferably, the number of the sub lenses of the first lens group 82 is equal to that of the red laser light sources 81a.

Each sub lens of the first lens group 82 has an upper surface on which the laser light beams are incident, and a lower surface from which the laser light beams are emitted, and the upper and lower surfaces of the lens have different grating states from each other.

That is, the laser light beam incident surface of the lens has a grating angle for converging the laser light beams, whereas the laser light beam emitting surface of the lens has a grating angle for changing the path of the laser light beams.

The grating structure of the sub lens may be changed in various manners in accordance with the design of the optical system.

The second lens group 83 is supported on the first surface of the member 80, and is used to diffract not only the light beams incident from the green laser light sources 81b of the multi-type laser light source 81, but also light beams reflected from the first mirror group 85, to emit the light beams onto the second surface of the member 80.

The second lens group 83 includes a plurality of sub lenses. The sub lenses are arranged in parallel such that each sub lens corresponds to an associated one of the green laser light sources 81b.

Preferably, the number of the sub lenses of the second lens group 83 is equal to that of the green laser light sources 81b.

Although each sub lens of the second lens group 83 has the same grating structure as that of the sub lens of the first lens group 82, it has a difference in that a beam splitter is provided a surface of the sub lens onto which the light beams reflected from the first mirror group 85 are incident, the beam splitter being adapted to transmit a green wavelength while performing total reflection of a red wavelength.

The third lens group 84 is supported on the first surface of the member 80, and is used to diffract not only the light beams incident from the blue laser light sources 81c of the multi-type laser light source 81, but also light beams reflected from the second mirror group 86, to emit the light beams onto the second surface of the member 80.

The third lens group 84 includes a plurality of sub lenses. The sub lenses are arranged in parallel such that each sub lens corresponds to an associated one of the blue laser light sources 81c.

Preferably, the number of the sub lenses of the third lens group 84 is equal to that of the blue laser light sources 81c.

Although each sub lens of the third lens group 84 has the same grating structure as that of the sub lens of the first lens group 82, it has a difference in that a beam splitter is provided at a surface of the sub lens onto which the light beams reflected from the second mirror group 86 are incident, the beam splitter being adapted to transmit a blue wavelength while performing total reflection of red and green wavelengths.

The first mirror group 85 is supported on the second surface of the member 80, and is used to reflect the light beams diffracted from the first lens group 82.

The first mirror group 85 includes a plurality of sub mirrors. The sub mirrors are arranged in parallel such that each sub mirror corresponds to an associated one of the sub lenses of the first lens group 82.

Preferably, the number of the sub mirrors of the first mirror group 85 is equal to that of the sub lenses of the first lens group 82.

The second mirror group 86 is supported on the second surface of the member 80, and is used to reflect the light beams diffracted from the second lens group 83.

The second mirror group 86 includes a plurality of sub mirrors. The sub mirrors are arranged in parallel such that each sub mirror corresponds to an associated one of the sub lenses of the second lens group 83.

Preferably, the number of the sub mirrors of the second mirror group 86 is equal to that of the sub lenses of the second lens group 83.

The first diffraction lens 87 is supported on the second surface of the member 80, and is used to diffract the light beams diffracted from the third lens group 84.

Here, the first diffraction lens 87 may be formed of a DOE type lens in the form of a bar.

The second diffraction lens 88 is supported on the first surface of the member 80, and is used to diffract the light beams diffracted from the first diffraction lens 87. The third diffraction lens 89 is supported on the second surface of the member 80, and is used to diffract the light beams diffracted from the second diffraction lens 88.

The scan mirror 90 is supported on the first surface of the member 80, and is used to scan the light beams diffracted from the third diffraction lens 89 based on an external control signal.

Here, the scan mirror 90 may use a galvano mirror scanning incident light beams in a two dimensional manner.

Alternatively, the scan mirror 90 may be substituted by two scan mirrors as occasion demands.

In such an alternative embodiment, the two scan mirrors include a galvano mirror scanning incident light beams horizontally and a galvano mirror scanning incident light beams vertically.

Preferably, the first and second surfaces of the light transmission member 80 are arranged to face each other, and the first, second, and third lens groups 82, 83, and 84, first and second mirror groups 85 and 86, first, second, and third diffraction lenses 87, 88, and 89, and scan mirror 90 are fabricated in the form of a flat plate, respectively.

The first, second, and third lens groups 82, 83, and 84, second diffraction lens 88, and scan mirror 90 are supported on the first surface of the light transmission member 80 while being arranged along the same line parallel to each other. Also, the first and second mirror groups 85 and 86, and first and third diffraction lenses 87 and 89 are supported on the second surface of the light transmission member 80 while being arranged along the same line parallel to each other.

The first, second, and third lens groups 82, 83, and 84, second diffraction lens 88, and scan mirror 90, which are supported on the first surface of the light transmission member 80, may be positioned alternately with the first and second mirror groups 85 and 86 and first and third diffraction lenses 87 and 89 which are supported on the second surface of the light transmission member 80, at a predetermined angle.

Now, the operation method of the portable projector in accordance with the third embodiment of the present invention having the above described configuration will be explained.

As shown in FIG. 7, first, the multi-type laser light source 81, which includes the plurality of red laser light sources 81a, green laser light sources 81b, and blue laser light sources 81c, emits light beams onto the first surface of the light transmission member 80 based on an external image signal.

The light beams, emitted from the red laser light sources 81a of the multi-type laser light source 81, are incident on the plurality of sub lenses of the first lens group 82, which are supported on the first surface of the light transmission member 80, respectively.

Subsequently, the first lens group 82 diffracts the incident light beams, to emit the light beams to the first mirror group 85 that is placed on the second surface of the light transmission member 80.

Then, the first mirror group 85 again diffracts the light beams diffracted from the first lens group 82, to emit the diffracted light beams to the second lens group 83 that is placed on the first surface of the light transmission member 80.

Meanwhile, the light beams emitted from the green laser light sources 81b of the multi-type laser light source 81, are incident on the plurality of sub lenses of the second lens group 83, which are supported on the first surface of the light transmission member 80, respectively.

Each sub lens of the second lens group 83 is provided at a lower surface thereof with a beam splitter (not shown) for transmitting a green wavelength while performing total reflection of a red wavelength. Accordingly, the second lens group 83 is able to diffract not only the green light beams incident from the green laser light sources 81b, but also the red light beams reflected from the first mirror group 85, to emit the diffracted light beams to the second mirror group 86 that is formed on the second surface of the member 80.

Subsequently, the second mirror group 86 diffracts the light beams diffracted from the second lens group 83, to reflect the light beams to the third lens group 84 that is placed on the first surface of the light transmission member 80.

Meanwhile, the light beams emitted from the blue laser light sources 81c of the multi-type laser light source 81, are incident on the plurality of sub lenses of the third lens group 84, which are supported on the first surface of the light transmission member 80, respectively.

Each sub lens of the third lens group 84 is provided at a lower surface thereof with a beam splitter (not shown) for transmitting a blue wavelength while performing total reflection of red and green wavelength. Accordingly, the third lens group 84 is able to diffract not only the blue light beams incident from the blue laser light sources 81c, but also the red and green light beams reflected from the second mirror group 86, to emit the diffracted light beams to the first diffraction lens 87 that is placed on the second surface of the member 80.

Subsequently, after being diffracted from the first diffraction lens 87, the red, green, and blue light beams are incident on the scan mirror 90 by way of the second and third diffraction lenses 88 and 89, to be incident on the scan mirror 90. Finally, the scan mirror 90 scans the incident light beams, to emit the light beams to an external screen.

Figure 8:
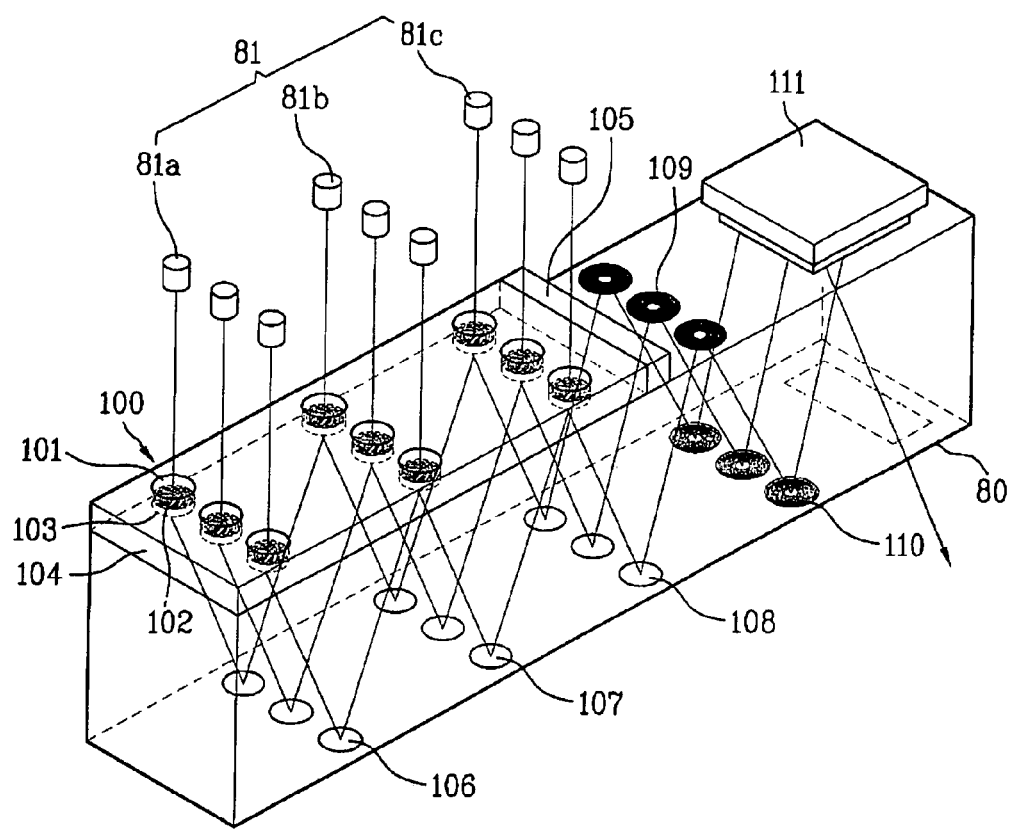
FIG. 8 is a perspective view illustrating a portable projector in accordance with a fourth embodiment of the present invention.

FIG. 8 is a perspective view illustrating a portable projector in accordance with a fourth embodiment of the present invention.

As shown in FIG. 8, in the fourth embodiment of the present invention, a speckle noise remover 100 is provided to remove noise of laser light beams.

The speckle noise remover 100 is placed on the first surface of the light transmission member 80.

The speckle noise remover 100 includes at least one beam splitter 103, a lens 102 placed on the beam splitter 103, and a plate 101 placed on the lens 102, the beam splitter 102, lens 102, and plate 101 being integrally formed with each other.

The beam splitter 103 is placed on the first surface of the member 80, and is used to transmit a specific wavelength of the light beams emitted from the light source.

The lens 102 is placed on a surface of the beam splitter 103, the surface facing the multi-type laser light source 81. The lens 102 is used to diffract the light beams emitted from the multi-type laser light source 81.

Here, the lens 102 may be a DOE lens having a grating structure.

The plate 101 is placed on a surface of the lens 102, the surface facing the multi-type laser light source 81. The plate 101 has an irregular surface pattern for removing speckle noise of the light beams emitted from the multi-type laser light source 81.

In the present invention, preferably, a random phase plate (RPP) is usable as the plate 101.

Figure 9:
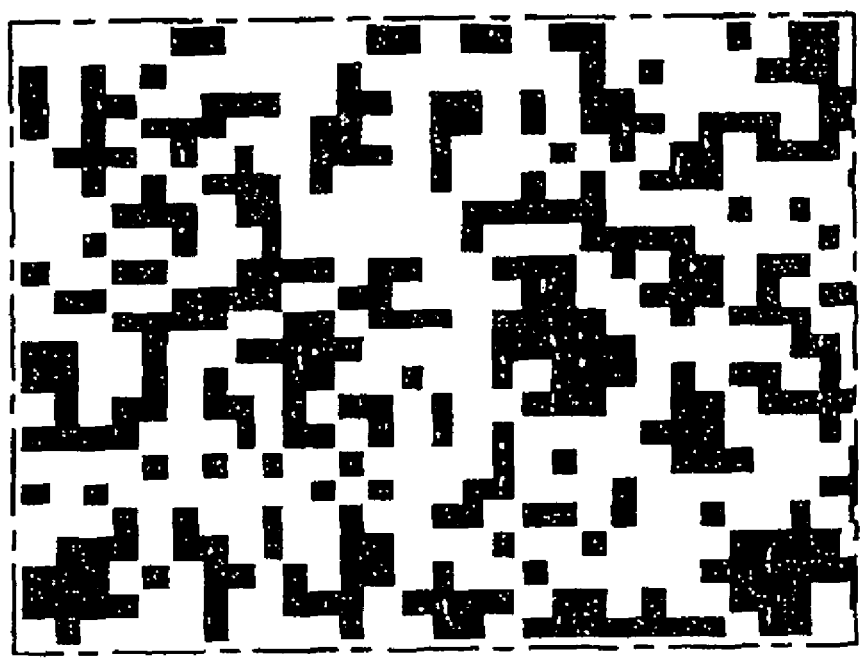
FIG. 9 is a view illustrating a hologram pattern that is generated at a plate of FIG. 8.

As shown in FIG. 9, it is desirable that the pattern of the plate 101 be a hologram pattern that is produced by a computer. Such a pattern varies the phase of laser light beams by $\pi$.

The area of the plate 101 is preferably larger than that of the beam splitter 103 or the lens 102.

A drive 105 is provided to simultaneously reciprocate the beam splitter 103, lens 102, and plate 101 in one direction.

Here, the drive 105 is adapted to induce fine vibrations of the plate 101 of the speckle noise remover 100 for removing speckle noise of the light beams.

Although any other means capable of causing vibrations having a short displacement are usable as the drive 105, it is preferable to use an electromagnetic element vibrating by an electric field, or a piezoelectric element vibrating while being expanded or constricted in accordance with a piezoelectric phenomenon.

Now, the path of light beams in accordance with the fourth embodiment of the present invention having the above described configuration will be explained.

As shown in FIG. 8, the laser light beams, emitted from the multi-type laser light source 81, are incident on the first surface of the member 80 such that they pass through the speckle noise remover 100. Thereby, the light beams, from which the speckle noise is removed, are reflected by mirrors 106, 107, and 108 that are placed on the second surface of the member 80.

Subsequently, the reflected light beams are emitted onto an external screen after passing through DOE lenses 109 and 110 and a scan mirror 111.

Here, the scan mirror 111 may be a galvano mirror scanning incident light beams in a two dimensional manner.

Alternatively, the scan mirror 111 may be substituted by two scan mirrors as occasion demands.

Figure 10A:
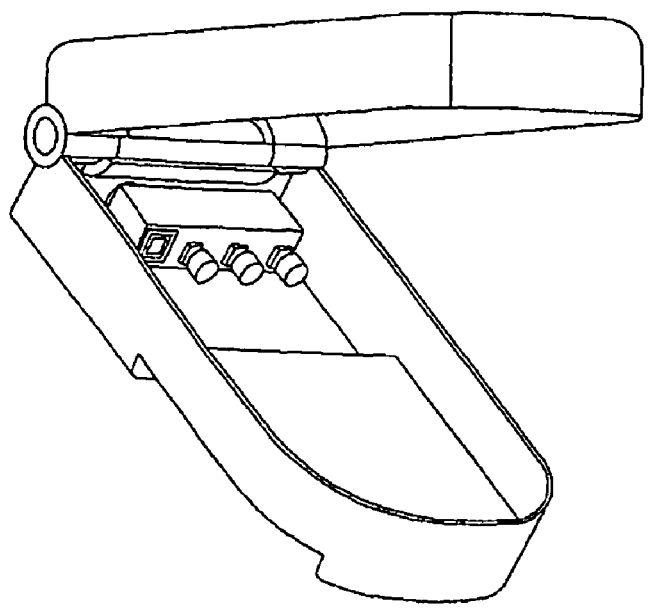
FIGS. 10A and 10B are schematic views illustrating a mobile laser projector phone using the portable projector in accordance with the present invention.
Figure 10B:
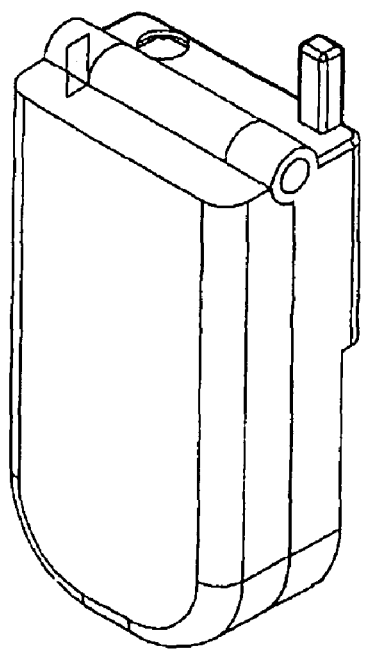

FIGS. 10A and 10B are schematic views illustrating a mobile laser projector phone using the portable projector in accordance with the present invention. As shown in FIGS. 10A and 10B, the projector of the present invention is conveniently applicable even to an appliance having a small interior space such as the mobile phone.

As apparent from the above description, the portable projector according to the present invention is configured in such a fashion that the plurality of optical elements are arranged at two facing surfaces of the light transmission member, thereby achieving a stabilized arrangement of the optical elements. Furthermore, the present invention allows light beams to be transmitted through the light transmission member. This has the effect of reducing the length of the path of light.

Accordingly, the present invention can achieve a reduction in size and weight of the projector. Therefore, the present invention is applicable to all kinds of portable appliances such as mobile phones, and enables a variety of designs as occasion demands, resulting in a wide application range.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A portable projector comprising:
   a light transmission member having a first surface and a second surface opposing to the first surface;
   a multi-type laser light source for emitting light beams onto the first surface of the member based on an external image signal, so as to allow the light beams to be transmitted into the member, the multi-type laser light source including a plurality of sub laser light sources;
   one or more optical elements supported on at least one of the first and second surfaces of the member for diffracting and reflecting the light beams incident from the multi-type laser light source into the member; and
   at least one multi-type scan mirror supported on one of the first and second surfaces of the member for scanning the light beams diffracted and reflected from the optical elements onto an external screen located at the outside of the member based on an external control signal,
   wherein the one or more optical elements and the at least one multi-type scan mirror are in contact with at least one of the first and second surfaces of the light transmission member, and
   the optical elements, which are in contact with the first surface of the light transmission member, are aligned alternately with the optical elements, which are in contact with the second surface of the light transmission member.

2. The projector as set forth in claim 1, wherein the light transmission member is a glass member, transparent plastic member, or hollow member having an atmosphere or vacuum pressure interior.

3. The projector as set forth in claim 1, wherein the light transmission member has a circular, semi-circular, triangular, or polygonal cross section.

4. The projector as set forth in claim 1, wherein the light transmission member has linear and flat surfaces.

5. The projector as set forth in claim 1, wherein, of all surfaces of the light transmission member, the at least one surface on which the optical elements are supported is raised or dented.

6. The projector as set forth in claim 1, wherein the first and second surfaces of the light transmission member face each other.

7. The projector as set forth in claim 1, wherein the optical elements include one or more elements selected from among a diffraction optical element, hologram optical element, and plane mirror.

8. The projector as set forth in claim 1, wherein each of the optical elements takes the form of a flat plate.

9. The projector as set forth in claim 1, wherein the optical elements, which are supported on the same surface of the light transmission member as each other, are arranged along the same line parallel to each other.

10. The projector as set forth in claim 1, wherein the optical elements, which are supported on the first surface of the light transmission member, are positioned alternately with the optical elements which are supported on the second surface of the light transmission member, at a predetermined angle.

11. The projector as set forth in claim 1, wherein the optical elements having drive circuits are arranged on one of the first and second surfaces of the light transmission member, and the optical elements having no drive circuit are arranged on the other surface.

12. The projector as set forth in claim 1, wherein the multi-type laser light source includes at least one first sub laser light source emitting red laser light beams, at least one second sub laser light source emitting green laser light beams, and at least one third sub laser light source emitting blue laser light beams, the first, second, and third sub laser light sources being arranged in parallel.

13. The projector as set forth in claim 1, wherein the multi-type scan mirror includes a first one-dimensional scan mirror scanning incident light beams horizontally and a second one-dimensional scan mirror scanning incident light beams vertically, or includes a two-dimensional scan mirror scanning incident light beams vertically and horizontally.

14. A portable projector comprising:
   a light transmission member having a first surface and a second surface opposing to the first surface;
   a multi-type laser light source for emitting laser light beams onto the first surface of the member based on an external image signal, so as to allow the light beams to be transmitted into the member, the multi-type laser light source including a plurality of sub laser light sources;
   a first lens group supported on the first surface of the member for diffracting the light beams incident from the multi-type laser light source, to emit the diffracted light beams to the second surface of the member, the first lens group including a plurality of sub lenses;
   a second lens group supported on the second surface of the member for diffracting the light beams diffracted from the first lens group, the second lens group including a plurality of sub lenses;
   a first multi-type scan mirror supported on the first surface of the member for scanning the light beams diffracted from the second lens group based on an external control signal; and
   a second multi-type scan mirror supported on the second surface of the member for scanning the light beams scanned from the first multi-type scan mirror based on an external control signal,
   wherein the first lens group and the first multi-type scan mirror are in contact with the first surface of the light transmission member,
   the second lens group and the second multi-type scan mirror are in contact with the second surface of the light transmission member, and
   the first lens group and the first multi-type scan mirror, which are in contact with the first surface of the light transmission member, are aligned alternately with the second lens group and the second multi-type scan mirror, which are in contact with the second surface of the light transmission member.

15. The projector as set forth in claim 14, wherein the number of the sub lenses of the first lens group is equal to that of the sub laser light sources of the multi-type laser light source, and the sub lenses of the first lens group are arranged in parallel to correspond to the respective sub laser light sources.

16. The projector as set forth in claim 14, wherein each sub lens of the first lens group is a diffraction optical element having a first surface on which the laser light beams are incident and a second surface from which the laser light beams are emitted, the first surface having a grating angle for converging the laser light beams, and the second surface having a grating angle for changing the path of the laser light beams.

17. The projector as set forth in claim 14, wherein the sub lenses of the second lens group are diffraction optical elements in the form of bars including a first sub lens diffracting red laser light beams, a second sub lens diffracting green laser light beams, and a third sub lens diffracting blue laser light beams.

18. The projector as set forth in claim 14, wherein the second lens group includes first, second, and third sub lenses, which are arranged along the same line parallel to each other.

19. The projector as set forth in claim 14, wherein the first multi-type scan mirror is a galvano mirror scanning incident light beams horizontally, and the second multi-type scan mirror is a galvano mirror scanning incident light beams vertically.

20. The projector as set forth in claim 14, wherein the first multi-type scan mirror includes a first sub scan mirror scanning red laser light beams, a second sub scan mirror scanning green laser light beams, and a third sub scan mirror scanning blue laser light beams, the first, second, and third sub scan mirrors being arranged in parallel.

21. The projector as set forth in claim 14, wherein the second multi-type scan mirror includes one or more sub scan mirrors, and the number of the sub scan mirrors is equal to that of the sub laser light sources of the multi-type laser light source.

22. A portable projector comprising:
a light transmission member having a first surface and a second surface opposing to the first surface;
a multi-type laser light source for emitting laser light beams onto the first surface of the member based on an external image signal, so as to allow the light beams to be transmitted into the member, the multi-type laser light source including a plurality of sub laser light sources;
a first lens group supported on the first surface of the member for diffracting the light beams incident from the multi-type laser light source, to emit the diffracted light beams to the second surface of the member, the first lens group including a plurality of sub lenses;
a second lens group supported on the second surface of the member for diffracting the light beams diffracted from the first lens group, the second lens group including a plurality of sub lenses;
a mirror supported on the first surface of the member for reflecting the light beams diffracted from the second lens group; and
a multi-type scan minor supported on the second surface of the member for scanning the light beams reflected from the minor based on an external control signal,
wherein the first lens group and the minor are in contact with the first surface of the light transmission member,
the second lens group and the multi-type scan mirror are in contact with the second surface of the light transmission member, and
the first lens group and the minor, which are in contact with the first surface of the light transmission member, are aligned alternately with the second lens group and the multi-type scan minor, which are in contact with the second surface of the light transmission member.

23. The projector as set forth in claim 22, wherein the multi-type scan minor is a galvano minor scanning incident light beams in a two dimensional manner.

24. A portable projector comprising:
a light transmission member having a first surface and a second surface opposing to the first surface;
a multi-type laser light source for emitting light beams onto the first surface of the member based on an external image signal, so as to allow the light beams to be transmitted into the member, the multi-type laser light source including one or more first, second, and third sub laser light sources;
a first lens group supported on the first surface of the member for diffracting the light beams incident from the first sub laser light sources, to emit the diffracted light beams to the second surface of the member, the first lens group including a plurality of sub lenses;
a first mirror group supported on the second surface of the member for reflecting the light beams diffracted from the first lens group, the first mirror group including a plurality of sub mirrors;
a second lens group supported on the first surface of the member for diffracting not only the light beams incident from the second sub laser light sources, but also the light beams reflected from the first mirror group, to emit the diffracted light beams to the second surface of the member, the second lens group including a plurality of sub lenses;
a second mirror group supported on the second surface of the member for reflecting the light beams diffracted from the second lens group, the second mirror group including a plurality of sub mirrors;
a third lens group supported on the first surface of the member for diffracting not only the light beams incident from the third sub laser light sources, but also the light beams reflected from the second mirror group, to emit the diffracted light beams to the second surface of the member, the third lens group including a plurality of sub lenses;
a plurality of diffraction lenses supported on at least one of the first and second surfaces of the member for diffracting the light beams diffracted from the third lens group; and
a scan mirror supported on the first surface of the member for scanning the light beams diffracted from the diffraction lenses based on an external control signal,
wherein the first, second, and third lens groups, the plurality of diffraction lenses, and the scan mirror are in contact with the first surface of the light transmission member,
the first and second lens groups, and the plurality of diffraction lenses are in contact with the second surface of the light transmission member, and
the first, second, and third lens groups, the plurality of diffraction lenses, and the scan mirror which are in contact with the first surface of the light transmission member, are aligned alternately with the first and second lens groups and the plurality of diffraction lenses, which are in contact with the second surface of the light transmission member.

25. The projector as set forth in claim 24, wherein the first sub laser light sources emit red laser light beams, the second sub laser light sources emit green laser light beams, and the third sub laser light sources emit blue laser light beams, the first, second, and third sub laser light sources being arranged in parallel to be uniformly spaced apart from one another.

26. The projector as set forth in claim 24, wherein the number of the sub lenses of the first, second, or third lens group is equal to that of the first, second, or third sub laser light sources, and the sub lenses of the first, second, or third lens group are arranged in parallel to correspond to the associated first, second, or third sub laser light sources.

27. The projector as set forth in claim 24, wherein each sub lens of the first, second, and third lens group is a diffraction optical element having a first surface on which the laser light beams are incident and a second surface from which the laser light beams are emitted, the first surface having a grating angle for converging the laser light beams, and the second surface having a grating angle for changing the path of the laser light beams.

28. The projector as set forth in claim 24, wherein each sub lens of the second lens group is provided, at a surface thereof on which the light beams reflected from the first mirror group are incident, with a beam splitter transmitting a green wavelength while performing total reflection of a red wavelength.

29. The projector as set forth in claim 24, wherein each sub lens of the third lens group is provided, at a surface thereof on which the light beams reflected from the second mirror group are incident, with a beam splitter transmitting a blue wavelength while performing total reflection of red and green wavelengths.

30. The projector as set forth in claim 24, wherein the scan mirror is a galvano mirror scanning incident light beams in a two dimensional manner.

31. The projector as set forth in claim 24, wherein the diffraction lenses include:
   a first diffraction lens supported on the second surface of the member for diffracting the light beams diffracted from the third lens group;
   a second diffraction lens supported on the first surface of the member for diffracting the light beams diffracted from the first diffraction lens; and
   a third diffraction lens supported on the second surface of the member for diffracting the light beams diffracted from the second diffraction lens.

32. The projector as set forth in claim 31, wherein the first diffraction lens is a diffraction optical element in the form of a bar.

33. The projector as set forth in claim 24, further comprising:
   a plurality of plates placed on one surface of the respective sub lens of the first, second, and third lens groups, the surface facing the multi-type laser light source, each plate having an irregular surface pattern for removing speckle noise of the light beams emitted from the multi-type laser light source.

34. The projector as set forth in claim 33, wherein each plate is integrally formed with the associated sub lens of the first, second, or third lens group.

35. The projector as set forth in claim 33, further comprising:
   a drive for simultaneously reciprocating the first, second, and third lens groups along with the plates in one direction.

36. The projector as set forth in claim 35, wherein the drive is an electromagnetic element or piezoelectric element.

* * * * *